US007693702B1

(12) United States Patent
Kerner et al.

(10) Patent No.: US 7,693,702 B1
(45) Date of Patent: Apr. 6, 2010

(54) VISUALIZING SPACE SYSTEMS MODELING USING AUGMENTED REALITY

(75) Inventors: Sara A. Kerner, San Jose, CA (US); Randy J. Stiles, Menlo Park, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 952 days.

(21) Appl. No.: 10/699,576

(22) Filed: Oct. 31, 2003

Related U.S. Application Data

(60) Provisional application No. 60/423,322, filed on Nov. 1, 2002.

(51) Int. Cl.
*G06F 9/44* (2006.01)
*G06F 9/45* (2006.01)
*G06F 3/00* (2006.01)
*B64G 1/36* (2006.01)
*G09G 5/00* (2006.01)
*H04N 9/47* (2006.01)

(52) U.S. Cl. ............ 703/22; 345/7; 345/8; 345/9; 345/629; 348/77; 703/21; 715/700; 701/13

(58) Field of Classification Search .......... 703/21, 703/22; 345/7, 8, 9, 629; 701/13; 715/700; 348/77
See application file for complete search history.

(56) References Cited

U.S. PATENT DOCUMENTS

| | | | | |
|---|---|---|---|---|
| 5,153,569 A | * | 10/1992 | Kawamura et al. | 345/8 |
| 5,281,960 A | * | 1/1994 | Dwyer, III | 345/31 |
| 5,491,510 A | * | 2/1996 | Gove | 348/77 |
| 5,987,363 A | * | 11/1999 | Quan et al. | 701/13 |
| 5,991,085 A | * | 11/1999 | Rallison et al. | 359/630 |
| 6,037,914 A | * | 3/2000 | Robinson | 345/7 |
| 6,166,744 A | * | 12/2000 | Jaszlics et al. | 345/629 |
| 6,175,343 B1 | * | 1/2001 | Mitchell et al. | 345/8 |
| 6,289,299 B1 | * | 9/2001 | Daniel et al. | 703/21 |
| 6,317,127 B1 | * | 11/2001 | Daily et al. | 345/629 |
| 6,369,952 B1 | * | 4/2002 | Rallison et al. | 359/630 |
| 6,411,266 B1 | * | 6/2002 | Maguire, Jr. | 345/8 |
| 6,917,370 B2 | * | 7/2005 | Benton | 345/633 |
| 7,050,078 B2 | * | 5/2006 | Dempski | 715/700 |
| 7,110,013 B2 | * | 9/2006 | Ebersole et al. | 346/8 |

(Continued)

OTHER PUBLICATIONS

"Powerful 3D-visualization for demanding users" GeoInformatics: Sep. 1999, pp. 38-41.*

(Continued)

*Primary Examiner*—Kamini S Shah
*Assistant Examiner*—Shambhavi Patel
(74) *Attorney, Agent, or Firm*—McDermott Will & Emery LLP

(57) ABSTRACT

A visualization system for a computer system includes a modeling portion configured to specify the virtual geographic location in response to a three-dimensional model of the virtual geographic location and in response to the position of the viewer with respect to the virtual geographic location, a satellite data portion configured to specify a representation of satellite status data in response to the position of the viewer with respect to the virtual geographic location and in response to the satellite status data, and a three-dimensional output portion configured to provide at least two images of the virtual geographic location and the representation of the satellite status data to the viewer.

28 Claims, 5 Drawing Sheets

U.S. PATENT DOCUMENTS

| | | | | |
|---|---|---|---|---|
| 7,289,130 | B1* | 10/2007 | Satoh et al. | 345/629 |
| 2002/0140633 | A1* | 10/2002 | Rafii et al. | 345/8 |
| 2002/0163521 | A1* | 11/2002 | Ellenby et al. | 345/502 |
| 2003/0014212 | A1* | 1/2003 | Ralston et al. | 702/150 |

OTHER PUBLICATIONS

Starner et al. "Towards Augmented Reality Gaming" 2000.*

Coltekin et al. "VRML as a Tool for Web-Based, 3D, Photo-Realistic GIS". IAPRS, vol. XXXIII 2000.*

Kato et al. "Virtual Object Manipulation on a Table-Top AR Environment", 2000.*

Slambrook, Gerald. "Three Dimensional Visualization to Support Command and Control". Sandia Report: Apr. 1997.*

Kato et al.("Virtual Object Manipulation on a Table-Top AR Environment", IEEE 2000.*

Nikulin et al. "Modeling of an Acousto-Optic Laser Beam Steering System Intended for Satellite Communication", Oct. 2001 Society of Photo-Optical Instrumentation Engineers.*

Barnhart et al. "Development and Application of an Object-Oriented Graphical Environment for the Simulation of Space-Based Sensing Systems", IEEE 1996.*

Leibe et al. "The Perceptive Workbench: Toward Spontaneous and Natural Interaction in Semi-Immersive Virtual Environments" 2000.*

Kato et al. "Virtual Object Manipulation on a Table-Top AR Environment", IEEE 2000.*

Kimura, Kazuhiro. "Satellite Orbit Analysis and Design by Virtual Reality", 1998.*

Stytz et al. "Distributed Virtual Environment for Satellite Orbital Modeling and Near-Earth Space Environment Simulation and Portrayal", Simulation 67:1, 1996.*

* cited by examiner

VISUALIZING SPACE SYSTEMS MODELING USING AUGMENTED REALITY

CROSS REFERENCE TO RELATED APPLICATIONS

The present application claims priority to and incorporates by reference for all purposes provisional application 60/423,322 filed Nov. 1, 2002.

BACKGROUND OF THE INVENTION

The present invention relates to augmented reality systems. More specifically, the present invention relates to augmented reality for space-based phenomena.

In the present system, space phenomena includes satellite orbits, satellite coverage area, satellite trajectory (both historical and projected), satellite positioning, and the like. In the present application, the term satellite is used broadly to encompass any item of interest that travels in space, e.g. orbiting satellites, the ISS, natural or man-made space debris, ICBMs, interceptors, laser communications beams, outbound satellites (e.g. Galileo, Pioneer, etc.), or the like.

In the past, users typically used traditional display technologies and a variety of indirect pointing and/or selection tools to interact with satellite data. Current "three-dimensional" (3D) visualization of space systems modeling is accomplished by presenting graphical representations of models on a two-dimensional (2D) display. Traditional displays included CRTs, LCDs, and the like for displaying the two-dimensional representations of space, satellites, and the like, and, conventional pointing devices included mice, joysticks, trackballs, "space orbs", roller wheels, and the like. These devices allowed users to interact with items in interest in the view presented to the user.

The space phenomena data is fundamentally three-dimensional (3D) in nature, and thus not suited for two-dimensional display and manipulation. Accordingly, current satellite visualization systems do not provide a natural or intuitive means to view and comprehend images. Further, current systems do not provide the user with intuitive methods to interact with such images.

Another drawback is that, collaboration of different systems using current satellite visualizations systems is difficult. For example, presently, users sit in front of their own terminals, and may discuss issues with other users who are all glued to their own terminals. Accordingly, it is very difficult for users to interact with each other, and to refer to the same data, as though they were in the same room.

In light of the above, what is needed are systems that provide the capability described above with fewer drawbacks.

BRIEF SUMMARY OF THE INVENTION

The present invention relates to augmented reality systems. More specifically, the present invention relates to augmented reality for space-based phenomena.

An augmented reality (AR) combines video and computer graphics to produce an image integrated with reality giving the impression that models are physically present in the room with observers. This revolutionary approach for augmented reality visualization has the potential to decrease systems development and analysis time by a factor of two. This would be accomplished by increasing human comprehension and memory at each stage of analysis and design using the spatial cues present in an augmented reality display. Recent DARPA-funded studies using functional Magnetic Resonance Imaging (fMRI) at Carnegie Mellon University and University of Virginia have proved that memory can be improved by 56% using spatial (3D) cues when compared with a conventional computer display. Furthermore, when testing subjects for memory using the MRI, it was shown that the spatial centers of their brains were engaged, in addition to their memory centers, while those that received information on a conventional computer display only used their memory centers. A different study showed that comprehension of complex 3D diagrams could be increased by a factor of 2.2 using the type of kinetic depth cues present in our augmented reality system. In this study, subjects that were presented views of 3D diagrams on a flat computer screen had much more errors in understanding a 3D diagram of given complexity than did the experimental group, which could interactively (real-time) rotate, move, and view the 3D diagram.

What is proposed is that satellite modeling information can be presented using an augmented reality system for a much more cognitive, effective visualization. The benefit of this improved visualization will result in faster conceptual engineering design, enhanced mission analysis, and aid scientific data interpretation as applied to both Satellite System Design and Analysis, Missile Defense Systems, and the like.

In embodiments of the present invention, each user is typically fitted with a video camera on a pair of heads-up glasses. The video camera image is used by the system to capture images of a real-world stage. The real-world stage is fitted with special pre-defined visual markers. Using image recognition software, the orientation of the user with respect to the real-world stage can be determined. Next, using a modeling software, the system specifies and constructs three-dimensional images of a view of a virtual world desired. The three-dimensional images are then projected to the user who wears the heads-up glasses. To the user, the net effect is similar to a hologram floating on top of the real-world stage. Additional data may be projected to the user via the heads-up glasses, including satellite data, or other status data, such as time, orientation, longitude and latitude lines, and the like. In other embodiments, the images provide the user with a two-dimensional image.

In additional embodiments, users can manipulate markers or paddles that include pre-defined visual markers. These paddles are recognized by the system, and thus the position of the paddles within the real-world stage is also determined. This real-world stage position is then translated into the virtual world, allowing the user to interact with the virtual world. This interaction may include selecting satellites, selecting orbits, selecting geographic areas, zooming-in and out of the three dimensional world, and the like.

Advantages to embodiments of the present invention include that it allows more than one user to interact with the three-dimensional image at the same time. Accordingly, multiple users can collaborate with each other while viewing from different positions of the three-dimensional world. Further, users can see and interact with each other.

Another advantage is that it allows users to directly select and manipulate objects in the virtual world as though such objects were tangible objects in the real-world. This is especially superior to prior art indirect manipulation methods using mice, space balls, etc.

Yet another advantage include is that it provides a large virtual display for the user to visualize the space data. In contrast, prior display-based systems were limited to screen size.

According to one aspect of the invention, a visualization system for a computer system is described. One apparatus includes a positioning portion configured to determine a position of a viewer with respect to a virtual geographic location, and a modeling portion configured to specify the virtual geographic location in response to a three-dimensional model of the virtual geographic location. One system also includes a model specification portion configured to specify a representation of satellite status data in response to the position of the viewer with respect to the virtual geographic location and in response to the satellite status data, and a three-dimensional output portion configured to provide at least two images of the virtual geographic location and the representation of the satellite status data to the viewer in response to the position of the viewer with respect to the virtual geographic location.

According to another aspect of the invention, a method for a computer system is disclosed. One technique includes determining a position of a viewer with respect to a virtual geographic location, and determining a model of the virtual geographic location in response to a three-dimensional model of the virtual geographic location. Various methods also include determining a representation of satellite status data in response to the position of the viewer with respect to the virtual geographic location and in response to the satellite status data, and displaying to the viewer a three-dimensional representation of the virtual geographic location and the representation of the satellite status data in response to the position of the viewer with respect to the virtual geographic location.

According to yet another aspect of the invention, a visualization method for a computer system is disclosed. One method includes displaying to a viewer a three-dimensional representation of a virtual location, a representation of the satellite status data as overlays on a physical location. The representation of the virtual location is determined in response to a model of the virtual location, and in response to a position of the viewer with respect to the model of the virtual location. Further, the representation of the satellite data is determined in response to satellite status data, and in response to a position of the viewer with respect to the model of the virtual location.

According to one embodiment of the invention, a visualization system for a computer system comprises a positioning portion configured to determine a position of a viewer with respect to a real world and a position of the viewer with respect to a virtual world. The positioning portion is also configured to allow the viewer to interact with the virtual world. The system further comprises a modeling portion configured to specify the virtual world in response to a model of the virtual world and a model specification portion configured to specify a representation of satellite status data in response to the position of the viewer with respect to the virtual world and in response to satellite status data. The system also comprises an output portion configured to provide an image of the virtual world super-imposed on an image of the real world. The image of the virtual world includes the representation of the satellite status data to the viewer in response to the position of the viewer with respect to the virtual world.

According to one aspect of the invention, a method for visualization of augmented reality comprises: determining a position of a viewer with respect to a real world and a position of the viewer with respect to a virtual world; determining a model of the virtual world; determining a representation of satellite status data in response to the position of the viewer with respect to the virtual world and in response to satellite status data; and displaying to the viewer a representation of the virtual world super-imposed on a representation of the real world. The representation of the virtual world includes the representation of the satellite status data in response to the position of the viewer with respect to the virtual world.

According to another aspect of the invention, a visualization method for a computer system comprises: displaying to a viewer a representation of a real world overlaid with a representation of a virtual world. The representation of the virtual world includes satellite status data. In addition, the representation of the virtual world is determined in response to a model of the virtual world, and in response to a position of the viewer with respect to the virtual world. The representation of the satellite status data is determined in response to satellite status data, and in response to a position of the viewer with respect to the virtual world. Furthermore, the viewer is allowed to interact with the virtual world.

According to one embodiment of the invention, a visualization system for a computer system comprises a positioning portion configured to determine a position of a viewer with respect a real world and a position of the viewer with respect to a virtual world. The positioning portion is also configured to allow the viewer to interact with the virtual world. The system further comprises a modeling portion configured to specify the virtual world in response to a model of the virtual world and a model specification portion configured to specify a representation of object status data in response to the position of the viewer with respect to the virtual world and in response to the object status data. The system also comprises an output portion configured to provide an image of the virtual world super-imposed on an image of the real world. The image of the virtual world includes the representation of the object status data to the viewer in response to the position of the viewer with respect to the virtual world.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

BRIEF DESCRIPTION OF THE INVENTION

Figure 1:
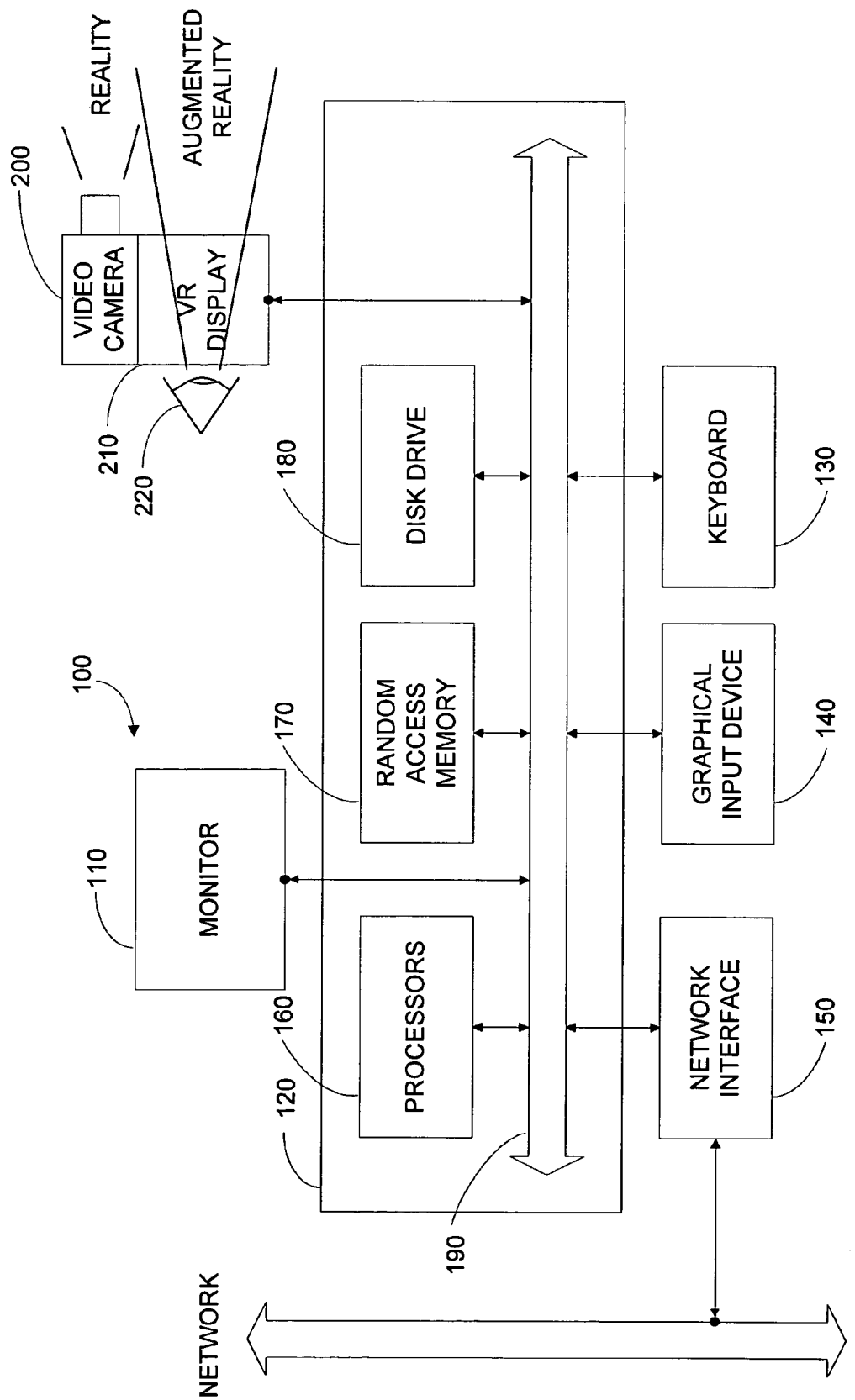
FIG. 1 illustrates a block diagram of a system according to one embodiment of the present invention.

FIG. 1 is a block diagram of typical computer rendering system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, wireless remote, and the like. User input device 140 typically allows a user to select objects, icons, text and the like that appear on the monitor 110.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having one or more microprocessors such as Pentium4™ microprocessor from Intel Corporation. Further, in the present embodiment, computer 120 typically includes a Windows™-based operating system.

RAM 170 and disk drive 180 are examples of tangible media for storage of data, audio/video files, computer programs, applet interpreters or compilers, virtual machines, embodiments of the herein described invention including driver-level software, three-dimensional data of the earth, satellite position data, satellite orbit data, projected trajectories, ground assets, other satellite data, application software such as ARToolKit, Satellite ToolKit (STK), WorldUp, custom software, and the like. Other types of tangible media include floppy disks, removable hard disks, optical storage media such as CD-ROMS and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

Also shown in FIG. 1 are an image acquisition sensor 200, and a heads-up projection system 210. In the present embodiment, image acquisition sensor 200 is a video camera mounted upon heads-up projection system 210. The video camera may be monochromatic or color. As will be described further below, image acquisition sensor 200 is used to capture an image of a "real-world" stage including orientation identifiers or markers. The captured image is processed by processors 160 to determine the position of user 220 with respect to the real-world stage, and with respect to the virtual world. In one embodiment, image acquisition sensor 200 is fixed to head-up projection system 210.

In this embodiment, heads-up projection system 210 is a pair of virtual reality glasses to which processors 160 feed different images to the right lens and the left lens. As is known, user 220 peers through the glasses and receives the different images. User 220 interprets the images as a three-dimensional image of a virtual world. In one embodiment, a Sony Glasstron heads-up display can be used, and in other embodiments, other heads-up-displays can be used.

As is illustrated, in the present embodiment, user 220 also sees the real-world with the virtual world super-imposed thereon. In embodiments of the present invention, a specialized graphics card may be used to drive heads-up projection system 210. In other embodiments, processors 160 feed identical images to the right and left lenses. Accordingly, the viewer sees a two dimensional image.

FIG. 1 is representative of computer rendering systems capable of embodying the present invention. It will be readily apparent to one of ordinary skill in the art that many other hardware and software configurations are suitable for use with the present invention. For example, the use of other micro processors are contemplated, such as Xeon™ or Itanium™ microprocessors; Opteron™ or AthlonXP™ microprocessors from Advanced Micro Devices, Inc; PowerPC G3™, G4 microprocessors from Motorola, Inc.; and the like. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like.

In one embodiment of the present invention, more than one heads-up projection system 210 and image acquisition sensor 200 may be provided per system 100 to allow different users to collaborate. In another embodiment, more than one system 100 may provided and linked by network, to allow different users to collaborate.

Figure 2:
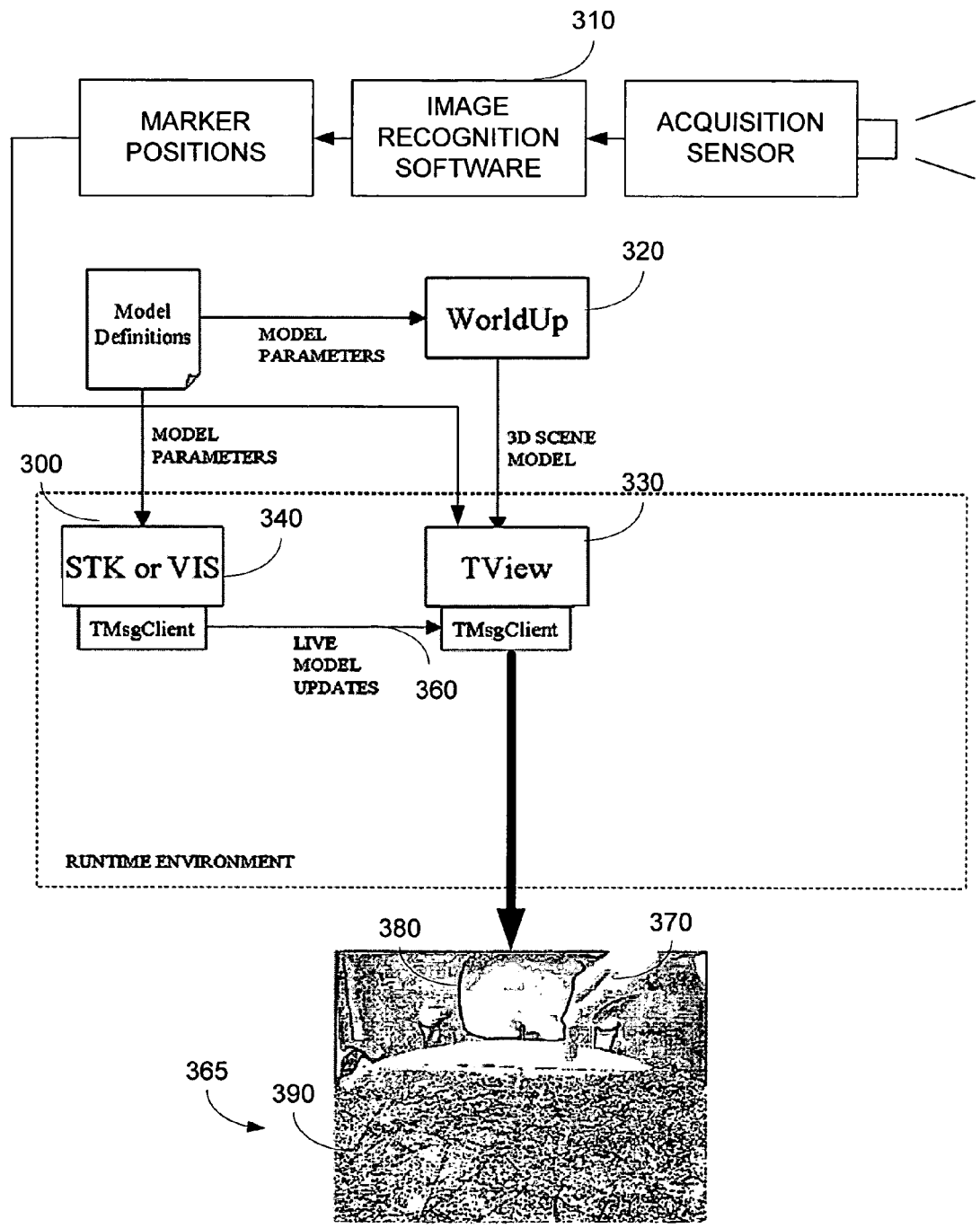
FIG. 2 illustrates a logical block diagram according to an embodiment of the present invention.

FIG. 2 illustrates a logical block diagram according to an embodiment of the present invention. As discussed above, application software may be provided to system 100. This software may include commercial, off-the-shelf software such as Satellite ToolKit (STK) 300 from Analytical Graphics, Inc. This software is a common tool used for space systems modeling that follows the traditional visualization of 3D graphics on a 2D flat screen display. It presents updates to a scene that generally includes data such as earth rotation, updated locations of any number of objects in the atmosphere and exo-atmosphere around it, and the like. As the scenario advances according to "simulation time" the software updates the objects in the scene according to time. In other embodiments of the present invention, other software may be used for modeling space systems, and the like.

Other software includes image recognition software 310, such as software based upon ARToolKit, an open source vision tracking library for augmented reality applications. ARToolKit was initially developed at the University of Washington HIT lab. In the present embodiment ARToolKit is used to write image recognition programs that process video images from image acquisition sensor 200, to locate predefined markers in the real-world. This data is used to determine the position and/or orientation of user 220 with respect to the markers. The position of user 220 with respect to the virtual world is used as input to the image rendering software. In the present embodiment, the markers may be static, upon a stage, or may be placed upon paddles and moved by user 220. In other embodiments of the present invention, additional image recognition software 310 may be used for the marker tracking and orientation determinations.

Additional software includes virtual world builder software 320, such as WorldUp, a product used for 3D-scene composition. WorldUp is a product developed by EAI Sense8 to define and develop 3D objects, scenes, and animation. In the present embodiment, WorldUp is used to create VRML models. Using WorldUp, a 3D scene can be defined and developed to include models for the earth, orbiting satellites, and the like. In this embodiment, the geometry and positions of each object modeled are defined relative to the scene origin, using data derived from image recognition software 310. The constructed image is saved as a VRML file to be loaded and viewed using the image rendering software (e.g. TView, described below).

In other embodiments of the present invention, other software packages may be used for three dimensional scene composition. Further, in other embodiments, other modeling languages may be used than VRML.

Custom software used in the present embodiment includes TView 330 and VIS 340 software, internally developed by the assignee of the present invention. In the present embodiment, VIS software 340 is a performance, analysis simulation, and modeling tool that provides remote sensing and space science capability. VIS software 340 may be used instead of SDK 300 to provide updates to the simulation model according to simulation time. Tview 330 is a software package that combines video and computer generated imagery to present an augmented view of reality to user 220. In this embodiment, it renders and generates images of the VRML models to user 220.

In other embodiments of the present invention, other software packages may be used to provide the space science and remote sensing capability, as well as to create images from the VRML data, and the like.

In the present embodiment, specifying the updates to the virtual world for user 220 is performed by either STK 300 or VIS 340. Both applications provide similar satellite simulation and modeling capabilities and simple methods of data extraction. Both packages provide run time-driven scenario simulations in which object models, such as satellites, etc., in the virtual world are updated according to the simulation time. At each time increment, the positions of the objects are extracted and are provided to TView 330 for display to user 220. Illustrated in FIG. 2 are message passing components 360. In one embodiment of the present invention, satellite simulation and other "live" modeling update data is provided by STK 300 or VIS 340 to TView 330 via message passing client/server components 360. The updated data may include updated satellite position, earth rotation, object orientation, and the like.

Figure 3:
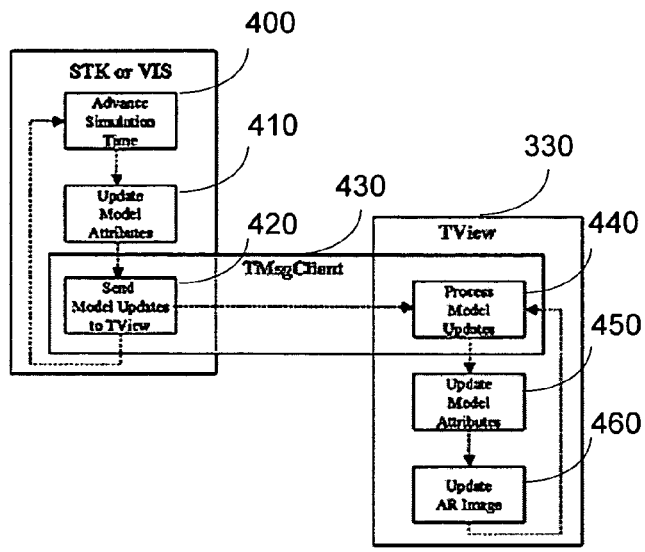
FIG. 3 illustrates a more detailed block diagram of a portion of an embodiment.

FIG. 3 illustrates a more detailed block diagram of a portion of an embodiment. More specifically, the operation of STK 300 and/or VIS 340 and TView 330 is shown in greater detail.

In this embodiment, STK 300 and/or VIS 340 run according to a simulation or "virtual world" time. For example, the simulation time may be in the past, or in the future, may run in real-time, slower than real-time, faster than real-time, be static, or the like. In either case, according to the virtual world time 400, STK and/or VIS 340, update the simulation model parameters 410, and pass the updated model parameters 420 via message client 430 to TView 330.

In response, TView 330, receives the updated model parameters 440, determines the model attributes in the virtual world 450, and updates the images of the virtual world 460.

In embodiments of the present invention, messages are pre-defined for several object manipulations including some relevant to satellite system movements such as translation, rotation, and scaling, and the like. APIs can be used to implement communications from TView 330 back to STK 300 or VIS 340.

Figure 4A:
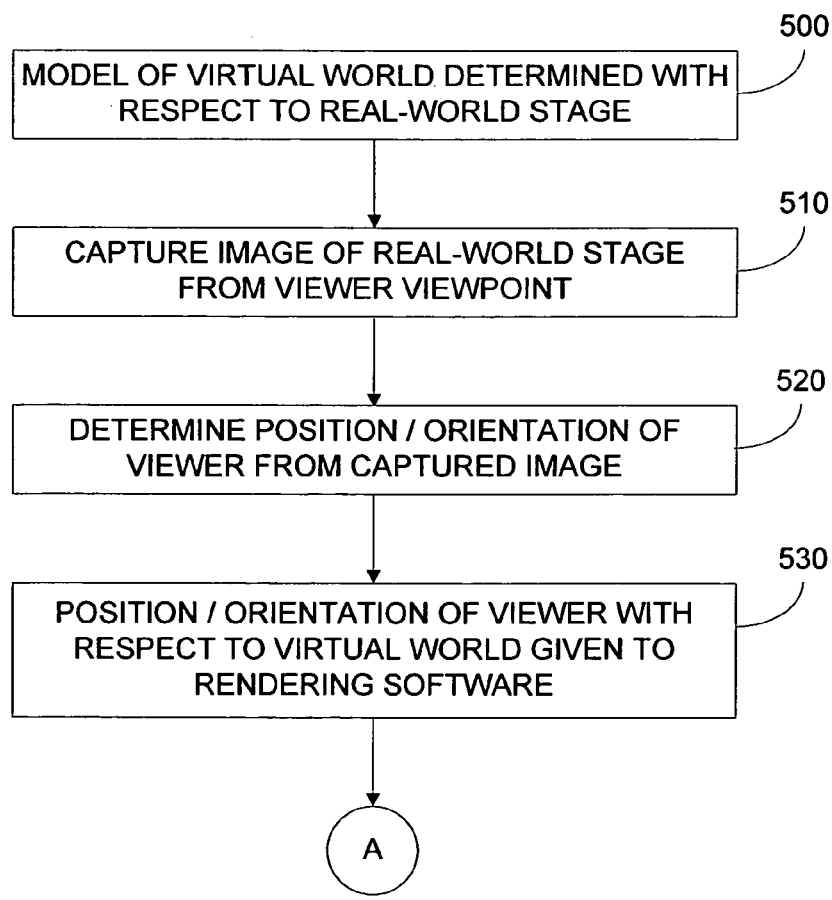
FIGS. 4A-4B illustrate a flow diagram according to an embodiment of the present invention.
Figure 4B:
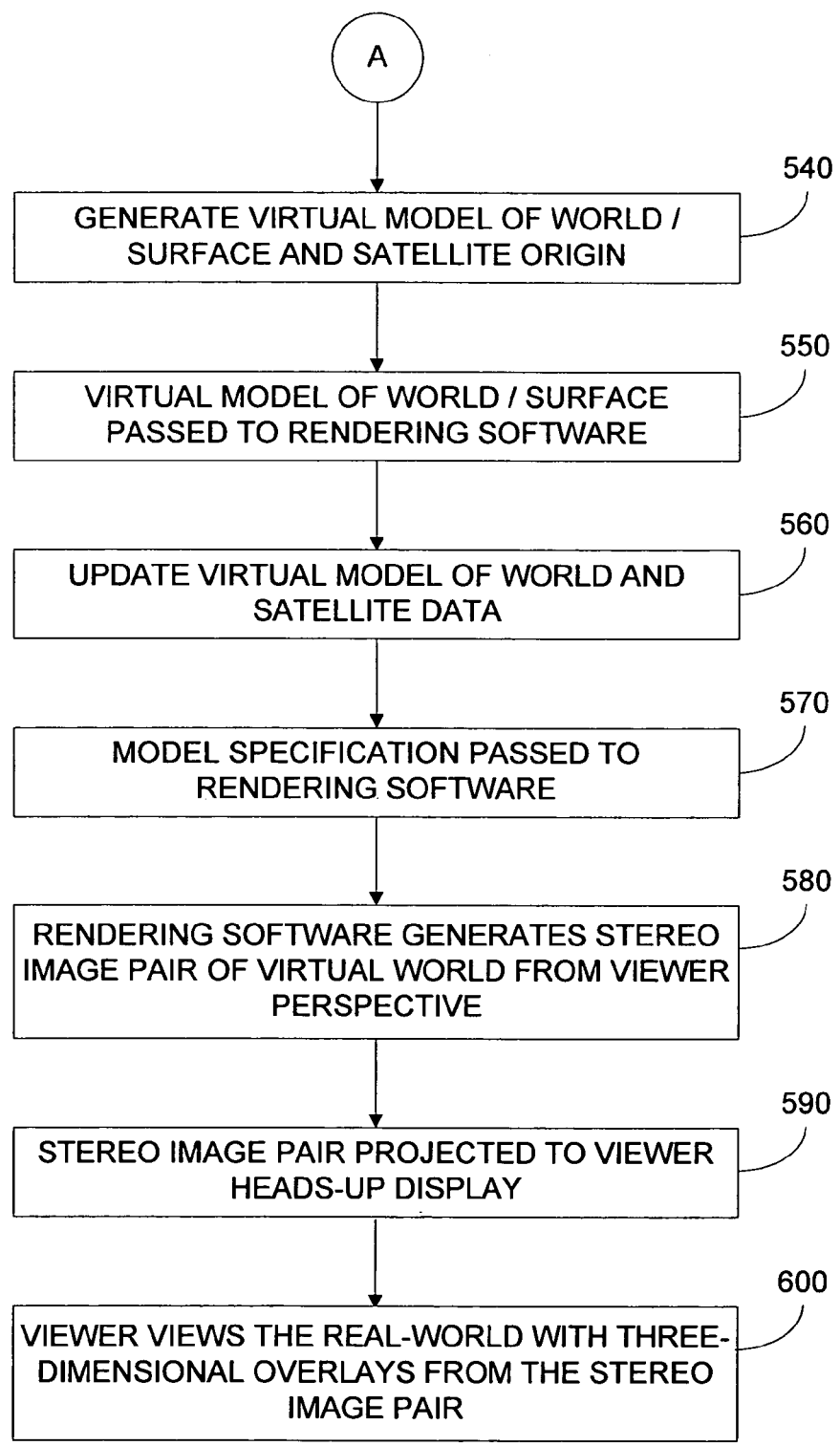

FIGS. 4A-4B illustrate a flow diagram according to an embodiment of the present invention.

Initially a model of the virtual reality world is specified and positioned within the real-world, step 500. As an example, in this step a designer may specify that the earth should appear as a one meter diameter sphere resting upon a table (real-world stage), or the like.

Next, an image of user 220 point of view is captured, step 510. In this example, user 220 may have put-on their integrated heads-up projection system 210 and image acquisition sensor 200 on their head. Next, an image from image acquisition sensor 200 captures one or more frames of video data.

In the present embodiment, the video data is processed by image recognition software 310 to determine the orientation of user 220 with respect to the real-world stage, step 520. As discussed above, one embodiment of the image recognition software may be based upon ARToolkit and upon one or more pre-defined "markers" positioned in the real-world stage. Continuing the example above, one or more markers may be placed upon the table.

The positioning data of user 220 to the stage is then input into the rendering software, step 530.

Next, the virtual world modeling software 320 generates a VRML model of the virtual world, step 540. This VRML model is then provided to the rendering software 330, step 550. Further, in response to the position of user 220, the model specification software updates the virtual model of the world, including updated satellite data, etc., step 560. For example, the software may specify updates to one or more orbital paths, satellite historical and projected trajectory, satellite coverage, the position and/or orientation of the viewer in the virtual world, and the like. The software may also specify updates to satellite status data, and the like. This data is passed to the rendering software 330, using the messaging client/server 360 described above, step 570.

In the present embodiment, based upon the VRML model and the model specification data, the rendering software 330 generates two separate output images, one for the right eye and one for the left eye of user 220, step 580. The image pair are then output to heads-up display 210, step 590. In response, user 220 sees the real-world stage overlaid with the images generated above, step 600.

In the present embodiment, the pair of images generated is provided to projection system 210, so user 220 sees a three-dimensional virtual world. In the present embodiment, the viewing points are determined in response to distance between the eyes of user 220, the distance of user 220 to the virtual world, the scale of the image being viewed, and the like. For example, for a view of the earth as a 1 meter high sphere, at 1 meter away from user 220, and the left eye is approximately 2 inches apart from the right eye in the real-world. In this example, the viewing point difference between the two eyes is calculated to be approximately 2500 kilometers. Accordingly, the viewing point difference is input into the rendering software to generate the right eye and the left eye images. In some embodiments, a standardized distance between the eyes of user 220 may be used, and in other embodiments, a customized distance may be used.

In other embodiments, rendering software 330 may generate a single image that is provided to both to the right eye and to the left eye.

In the present embodiment, as the user moves around the real-world stage, the process repeats for the updated position of user 220. For example, as the user moves away from a table, an image of the earth may shrink; as the user moves clock-wise with respect to an image of the earth, the user will move "west" in the virtual world; and the like.

In some embodiments, markers may be placed upon "paddles" in the real-world. As these paddles are moved around the real-world, image recognition software 310 can track the position of the marker in the virtual world. In this way, users 220 can interact with the virtual world. For example, the user may select a satellite in orbit to view its status; the user may target a portion of the earth; the user may direct a satellite to move to a different position; and the like. Many other types of interaction are contemplated in other embodiments of the present invention.

In the present embodiment, the term "augmented reality" (AR) is used to describe the system, because real-world images are augmented with computer generated images. An example of the advantages of embodiments of the present invention are illustrated in FIG. 2. In FIG. 2, an output image 365 is illustrated. As can be seen, part of the virtual-world can be seen, including a portion of a map 370. Additionally, the real-world can be seen, including a human hand 370 gesturing to a position on map 370 and a chair 390. As can be seen, users can collaborate together in the virtual world in a way much more intuitive than was previously possible.

In Space Systems applications involving joint-forces war fighting missions, AR visualization could provide the basis of an advanced human-systems interface for achieving and maintaining battlespace awareness and tactical dominance. For example, a detailed 3D geo-spatial visualization of battlespace terrain with location of friendly and enemy forces and their GPS-related assets could provide future GPS satellite operators the information superiority required to provide our theater war fighters with optimal GPS signal coverage and power in the successful execution of time-critical missions.

Figure 5:
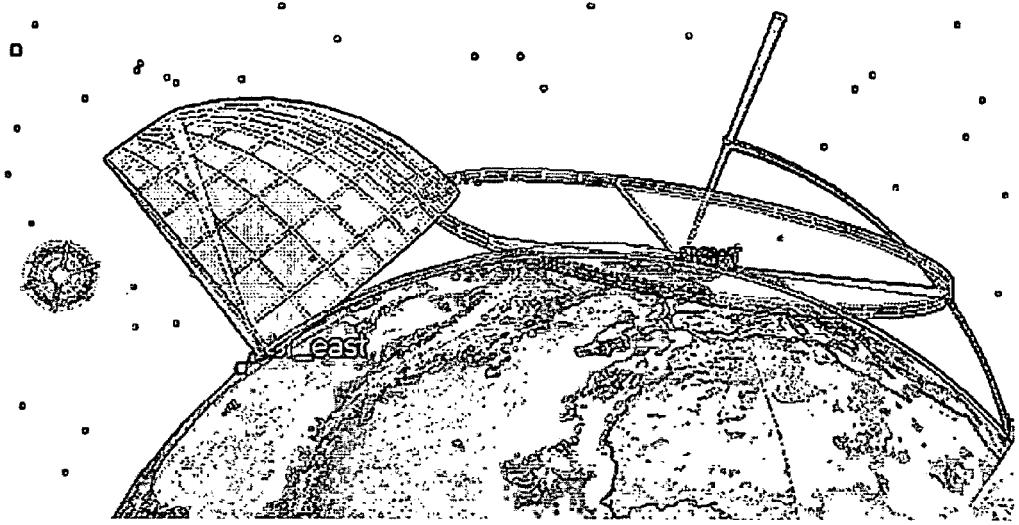
FIGS. 5 and 6 illustrates application output according to embodiments of the present invention.

Embodiments of the present invention can be extended from satellite system applications into missile defense command and control and training, as illustrated in FIG. 5. For example, software implementing Recognition-Primed Decision models can be incorporated that suggests appropriate solutions for problems based on recognition of the class of problem. Hence, easier recognition of the problem leads to a faster result with the appropriate solution. Military commanders in charge of missile defense would benefit from augmented reality visualization during threat situations. Faster recognition of the situation at hand would allow faster responsive action decisions and faster interceptions of threat vehicles. Training for missile defense command would also be more effective using AR visualization. FIG. 5 depicts STK visualization of a missile defense threat scenario. This type of visualization could also be presented in Augmented Reality to provide improved user comprehension and user collaboration.

In applications of Missile Defense Systems, AR visualization of tracking algorithms would greatly enhance cluster-tracking abilities. Threat tracking has evolved from reading and interpreting track tables of numbers to 2D paper plotting to 3D flat screen displays. Each evolution has resulted in great strides in the ability to identify and track the real threat. AR visualization would make the next great stride. It would enable faster anomaly identification leading to discrimination algorithm refinement.

Figure 6:
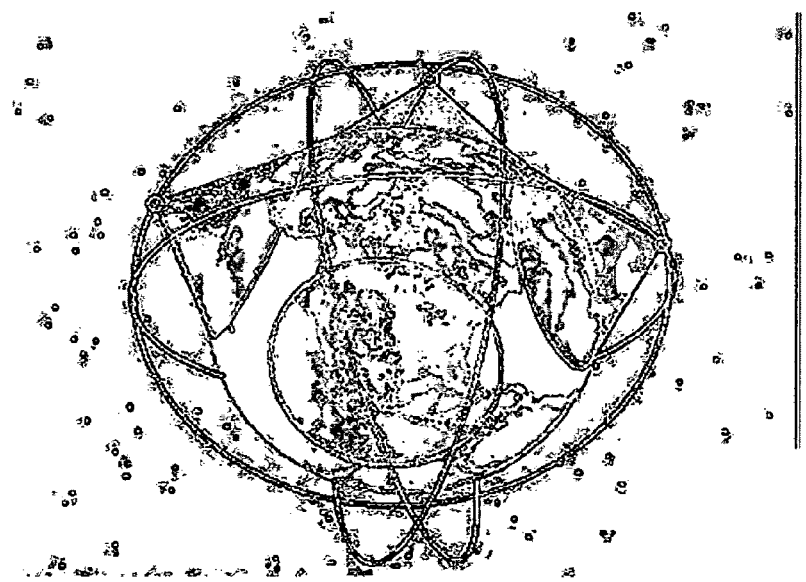

Other embodiments can be applied to Satellite System Design and Analysis, illustrated in FIG. 6. In such embodiments, augmented reality visualization would reduce development time, and improve constellation and mission analysis capabilities. AR could be used for visualization of satellites, constellations, communications links, and satellite performance projections on the earth's surface, as well as other possible applications. Visualization of this information in AR would improve cognition of design issues and help evaluate analysis data.

In the foregoing specification, the invention has been described with reference to specific exemplary embodiments thereof. In other embodiments of the present invention, different types of satellite data may be represented in augmented reality including current, past, and future positions of the satellite, orientations of the satellite, ground coverage of the satellite, trajectories of the satellite, satellite sensor orientation and position, orientation vectors to other satellites, or objects, missile threat clouds, coverage analysis, when satellites are in a view of a region, satellite revisit time, communication links and networks, beam strength of space and land based laser devices, and the like.

Many changes or modifications are readily envisioned. In light of the above disclosure, one of ordinary skill in the art would recognize that any number of combinations of visualization techniques, modeling techniques, display techniques, and the like may be used. For example, other sources of three-dimensional modeling can be used, other image recognition software and techniques can be used, or the like.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A visualization system for augmented reality, the visualization system for developing a three-dimensional representation of a space system, the visualization system comprising:
   a tangible medium comprising:
      a positioning portion configured to determine a position of a viewer with respect to a real world and a position of the viewer with respect to a virtual world, the positioning portion configured to allow the viewer to interact with the virtual world;
      a modeling portion configured to specify the virtual world in response to a space system model of the virtual world, the space system model including models for the earth and satellites, the space system model based on historical and projected trajectories of satellites;
      a model specification portion configured to specify a representation of satellite model status data of the satellites in response to the position of the viewer with respect to the virtual world and in response to satellite model status data of the satellites;
      an output portion configured to provide a three-dimensional representation of a space system, the three-dimensional representation of the space system including an image of the virtual world super-imposed on an image of the real world as being seen by the viewer, the image of the virtual world including the representation of the satellite model status data of the satellites to the viewer in response to the position of the viewer with respect to the virtual world, the representation of the satellite model status data of the satellites including a three-dimensional representation of satellite orbits, the image of the virtual world including a three-dimensional representation of the models for the earth and the satellites;
      a simulation portion configured to select a virtual world time from a past time, a future time, a slower than real time, a static time and a faster than real time, run a simulation of the virtual world in the selected virtual world time, extract a position of an object in the space system model based on the virtual world time and update the image of the virtual world based on the extracted position; and
      an input portion configured to allow the viewer to select one of the satellites to view satellite model status data of the selected one of the satellites and configured to allow the viewer to move the selected one of the satellites to a different position, wherein the representation of the satellite model status data of the satellites further comprises a representation selected from the group: satellite sensor orientation, satellite sensor position, and satellite system design data.

2. The visualization system of claim 1 further comprising:
an image acquisition source configured to capture at least an image comprising an image of the real world, and an image of at least a pre-determined marker positioned in the real world,
wherein the positioning portion comprises:
an image processing portion configured to determine the position of the viewer with respect to the real world in response to the image of the pre-determined marker; and
a virtual positioning portion configured to translate the position of the viewer in the real world to the position of the viewer in the virtual world.

3. The visualization system of claim 1 wherein a model of the virtual world is a multi-dimensional model of the virtual world, and the output portion is a multi-dimensional output portion.

4. The visualization system of claim 1 wherein the representation of the satellite model status data further comprises a representation selected from the group: a current position of a satellite, a past position of a satellite, a future position of a satellite, an orientation of a satellite, a trajectory of a satellite, ground coverage of a satellite, a satellite's orientation vectors to other satellites or objects, a satellite's coverage analysis when the satellite is in a view of a region, satellite revisit time, a satellite communication link or network, beam strength of space, and satellite systems status.

5. The visualization system of claim 1 further comprising a heads-up pair of glasses.

6. The visualization system of claim 1 wherein the visualization system is configured to allow more than one user to interact with the image of the virtual world at the same time and is configured to allow the more than one user to collaborate with each other while viewing from different positions.

7. The visualization system of claim 5 wherein the heads-up pair of glasses are also configured to allow the viewer to view the image of the virtual world super-imposed on the image of the real world.

8. A method for visualization of augmented reality to develop a three-dimensional representation of a space system, the method comprising:
determining a position of a viewer with respect to a real world and a position of the viewer with respect to a virtual world;
determining a space system model of the virtual world, the space system model including models for the earth and satellites, the space system model based on historical and projected trajectories of satellites;
determining a representation of satellite model status data of the satellites in response to the position of the viewer with respect to the virtual world and in response to satellite model status data of the satellites;
displaying to the viewer a three-dimensional representation of a space system, the three-dimensional representation of the space system including a representation of the virtual world super-imposed on a representation of the real world as being seen by the viewer, the representation of the virtual world including the representation of the satellite model status data of the satellites in response to the position of the viewer with respect to the virtual world, the representation of the satellite model status data of the satellites including a three-dimensional representation of satellite orbits, the image of the virtual world including a three-dimensional representation of the models for the earth and the satellites;
selecting one of the satellites, by the viewer, to view satellite model status data of the selected one of the satellites; and
moving the selected one of the satellites, by the viewer, to a different position,
selecting a virtual world time from a past time, a future time, a slower than real time, a static time and a faster than real time;
running a simulation of the virtual world in the selected virtual world time, and
updating the image of the virtual world based on the virtual world time by extracting a position of an object in the space system model;
wherein the representation of the satellite model status data of the satellites further comprises a representation selected from the group: satellite sensor orientation, satellite sensor position, and satellite system design data.

9. The method of claim 8 wherein the step of determining the position of the viewer comprises:
capturing of at least one pre-determined marker positioned in the real world;
determining a position and orientation of the viewer with respect to the real world in response to the image of the pre-determined marker; and
determining the position of the viewer with respect to the virtual world in response to determining the position and orientation of the viewer with respect to the real world.

10. The method of claim 8 wherein a model of the virtual world is a multi-dimensional model of the virtual world, and the representation of the virtual world is a multi-dimensional representation of the virtual world.

11. The method of claim 8 wherein the representation of the satellite model status data further comprises beam strength of land based laser devices, and the image of the real world as being seen by the viewer is an image of a real world stage as being seen by the viewer.

12. The method of claim 8 wherein the step of displaying comprises displaying the representation of the real world and the representation of the virtual world to the viewer with a pair of heads-up glasses.

13. The method of claim 9 wherein the step of capturing the image of the pre-determined marker uses a video camera, and the video camera is disposed upon the pair of head-up glasses.

14. The method of claim 8 wherein the viewer views the representation of the real world at the same time as the representation of the virtual world.

15. A method for visualization of augmented reality, the method for developing a three-dimensional representation of a space system, the method comprising:
determining a space system model of a virtual world, the space system model including models for the earth and satellites, the space system model based on historical and projected trajectories of satellites;
determining a representation of satellite model status data of the satellites in response to satellite model status data of the satellites, and in response to a position of a viewer with respect to the virtual world;
determining a representation of the virtual world in response to the space system model of the virtual world and in response to a position of the viewer with respect to the virtual world;
displaying to the viewer a three-dimensional representation of a space system, the three-dimensional representation of the space system including a representation of a real world as being seen by the viewer overlaid with the representation of the virtual world, the representation of the virtual world including the representation of the satellite model status data of the satellites, the representation of the satellite model status data of the satellites including a three-dimensional representation of satellite orbits, the representation of the virtual world including a three-dimensional representation of the models for the earth and the satellites;

selecting one of the satellites, by the viewer, to view satellite model status data of the selected one of the satellites;

moving the selected one of the satellites, by the viewer, to a different position, selecting a virtual world time from a past time, a future time, a slower than real time, a static time and a faster than real time;

running a simulation of the virtual world in the selected virtual world time; and updating the image of the virtual world based on the virtual world time by extracting a position of an object in the space system model;

wherein the viewer is allowed to interact with the virtual world.

16. The visualization method of claim 15 wherein the position of the viewer with respect to the virtual world is determined in response to an image of a pre-determined marker positioned in the real world taken from a vantage point of the viewer and in response to a correspondence between the virtual world and the real world.

17. The visualization method of claim 15 wherein the representation of the satellite model status data of the satellites comprises missile threat clouds, and the image of the real world as being seen by the viewer is an image of a real world stage as being seen by the viewer.

18. The visualization method of claim 15 wherein the representation of the virtual world and the representation of the real world are provided to the viewer with a pair of heads-up display glasses.

19. The visualization method of claim 15 further comprising displaying to the viewer a portion of the virtual world selected by the viewer,
wherein the viewer selection is determined in response to a position of a viewer-controlled marker with respect to the virtual world, wherein the marker is positioned in the real world.

20. The visualization method of claim 19 wherein the step of displaying to the viewer the portion of the virtual world selected by the viewer comprises overlaying an icon over the portion of the virtual world displayed to the viewer.

21. The visualization system of claim 1 wherein the image of the real world and the image of the virtual world are provided in real-time.

22. The method of claim 8 wherein the step of displaying comprises displaying to the viewer in real time the representation of the real world and the representation of the virtual world.

23. The visualization method of claim 15 wherein the step of displaying comprises displaying to the viewer in real time the representation of the real world overlaid with the representation of the virtual world.

24. The visualization system of claim 1 wherein the viewer is allowed to perform one or more of the following: selecting a satellite, selecting an orbit, selecting a geographic area, or zooming-in or out of the virtual world.

25. The visualization system of claim 1 wherein the viewer is allowed to directly select and manipulate objects in the virtual world without using a mouse.

26. The visualization system of claim 1 wherein the positioning portion comprises a marker positioned in the real world, the marker is static or is placed upon a paddle that includes a pre-defined visual marker in the real world, and the paddle is capable of being moved around the real world.

27. A visualization system for augmented reality, the visualization system for developing a three-dimensional representation of a space system, the visualization system comprising:
a processor for executing instructions, the instructions comprising:
determining a position of a viewer with respect a real world and a position of the viewer with respect to a virtual world;
specifying the virtual world in response to a space system model of the virtual world, the space system model including models for the earth and satellites, the space system model based on historical and projected trajectories of satellites;
specifying a representation of satellite model status data of the satellites in response to the position of the viewer with respect to the virtual world and in response to satellite model status data of the satellites;
providing a three-dimensional representation of a space system, the three-dimensional representation of the space system including an image of the virtual world super-imposed on an image of the real world as being seen by the viewer, the image of the virtual world including the representation of the satellite model status data of the satellites to the viewer in response to the position of the viewer with respect to the virtual world, the representation of the satellite model status data of the satellites including a three-dimensional representation of satellite orbits, the image of the virtual world including a three-dimensional representation of the models for the earth and the satellites;
selecting a virtual world time from a past time, a future time, a slower than real time, a static time and a faster than real time;
running a simulation of the virtual world in the selected virtual world time;
updating the image of the virtual world based on the virtual world time by extracting a position of an object in the space system model; and
allowing the viewer to select one of the satellites to view satellite model status data of the selected one of the satellites and allowing the viewer to move the selected one of the satellites to a different position.

28. The visualization system of claim 27 wherein the representation of the satellite model status data of the satellites comprises a representation selected from the group: a current position of a satellite, a past position of a satellite, a future position of a satellite, an orientation of a satellite, ground coverage of a satellite, a trajectory of a satellite, satellite sensor orientation, satellite sensor position, a satellite's orientation vectors to other satellites or objects, a satellite's coverage analysis when the satellite is in a view of a region, satellite revisit time, a satellite communication link or network, missile threat clouds, beam strength of space and land based laser devices, satellite systems status, and satellite system design data.

* * * * *